United States Patent
Cooper et al.

(10) Patent No.: US 6,678,245 B1
(45) Date of Patent: Jan. 13, 2004

(54) PACKET NETWORK PERFORMANCE MANAGEMENT

(75) Inventors: Carl Anthony Cooper, Holmdel, NJ (US); Brion Noah Feinberg, Morganville, NJ (US); Howard Roger Itzkowitz, Manalapan, NJ (US); Barbara Jane Taylor, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/223,940

(22) Filed: Dec. 31, 1998

Related U.S. Application Data

(60) Provisional application No. 60/073,195, filed on Jan. 30, 1998.

(51) Int. Cl.[7] .............................................. H04L 12/24
(52) U.S. Cl. ........................ 370/230; 370/235; 370/252
(58) Field of Search ............................ 370/230, 230.1, 370/231, 232, 235, 252, 254, 400, 401, 409; 709/223, 224, 225, 226, 229

(56) References Cited

U.S. PATENT DOCUMENTS

| | | | | |
|---|---|---|---|---|
| 4,979,118 A | * | 12/1990 | Kheradpir ................... | 364/436 |
| 5,042,027 A | * | 8/1991 | Takase et al. ................. | 370/54 |
| 5,258,979 A | * | 11/1993 | Oomuro et al. ............ | 370/95.1 |
| 5,274,625 A | * | 12/1993 | Derby et al. ................... | 370/17 |
| 5,598,532 A | * | 1/1997 | Liron .................... | 395/200.01 |
| 5,867,483 A | * | 2/1999 | Ennis, Jr. et al. ........... | 370/252 |
| 5,886,643 A | * | 3/1999 | Dieboll et al. ......... | 340/825.08 |
| 5,974,237 A | * | 10/1999 | Shurmer et al. ....... | 395/200.54 |
| 6,058,102 A | * | 5/2000 | Drysdale et al. ............ | 370/252 |

* cited by examiner

Primary Examiner—Steven H. D Nguyen
Assistant Examiner—Duc Duong

(57) ABSTRACT

Enhanced operation is attained for packet networks with a performance management operations system (PMOS) that receives information from network elements concerning loads carries and lost packets, receives threshold and other parameter information for a network management console, performs various calculations on the received information, and develops recommendations for setting of adjustable network elements controls that affect the quality of service that those elements provide. For those network elements that are capable of receiving operation control signals from the PMOS and that the network management console ceded a measure of control to the PMOS, the developed recommendations are converted to control signals that are directly applied by the PMOS to the network elements to control the network elements' operations.

26 Claims, 1 Drawing Sheet

PACKET NETWORK PERFORMANCE MANAGEMENT

REFERENCE TO RELATED APPLICATION

This application claims the benefit of provisional application No. 60/073,195, filed Jan. 30, 1998, titled "Data Structures and Algorithms for ATM Performance Management OS."

BACKGROUND OF THE INVENTION

This invention relates to fast packet networks and, more particularly, to performance management and control of such networks.

The voice network comprises a large plurality of interconnected switches that are arranged hierarchically and adapted to route voice traffic. The notion of managing such a network is not new. In the context of such voice networks, the network management paradigm includes having the switches report various status indications, such as what load they carry, and what spare capacity they have to a network management center. Based on this information, the network management center controls routing of forthcoming calls when necessary (e.g. when switch failures occur).

Packet networks (e.g. ATM, IP, and Frame Relay) are quite different in their operation and consequent behavior and, till now, there has not been an overall network management operations system that could be applied to such packet networks. Companies like Cisco and NewBridge do make element management systems (EMSs) which interact with a plurality of their respective network elements (e.g., routers and switches). An interface has been standardized for the communication of information between network elements (NEs) and the EMS with which they communicate. Different types of networks have different standards, however. For example, the standard for ATM networks is different from the standard for IP networks.

To provide a view of the entirety of a packet network, there is a need to combine the information that is obtained from the numerous EMSs that are installed in the network, and some of the above-mentioned companies have attempted to create such systems. However, the available systems appear to only report on the provided information and develop alarm reports when thresholds are exceeded, but do no other analysis of the data. Consequently, these systems cannot make recommendations for altering the behavior of the NEs and, expectedly, do not have a mechanism for actually controlling the NEs. This, of course, leads to a less than optimized utilization of the packet network.

SUMMARY

The problems of the prior art are overcome, and enhanced operation is attained for packet networks with a performance management operations system (PMOS) that receives information from network elements concerning loads carried and lost packets, receives threshold and other parameter information for a network management console, performs various calculations on the received information, and develops recommendations for setting of adjustable network elements controls that affect the quality of service that those elements provide. For those network elements that are capable of receiving operation control signals from the PMOS and that the network management console ceded a measure of control to the PMOS, the developed recommendations are converted to control signals that are directly applied by the PMOS to the network elements to control the network elements' operations.

DETAILED DESCRIPTION

Before proceeding with the detailed description of this invention, it is noted that much can be gained from reading and familiarizing oneself with the following texts:

[1] ATM Forum, "Traffic Management Specification, Version 4.0," Document number af-tm-00556.000, March 1996.

[2] ATM Forum, "Private Network-Network Interface Specification, Version 1.0," Document Number af-pnni-0055.000 April 1996.

[3] ATM Forum, "M4 Network Element View Interface Specification and Logical MIB, Version 2.0," Document number af-nm-0020.001 (in publication).

[4] Internet Engineering Task Force, "Management Information Base for Network Management of TCP/IP-based Internets: MIB II," Document number RFC-1213, March 1991.

[5] Internet Engineering Task Force, "IP Forwarding Table MIB," Document number RFC-1354, July 1992.

Figure 1:
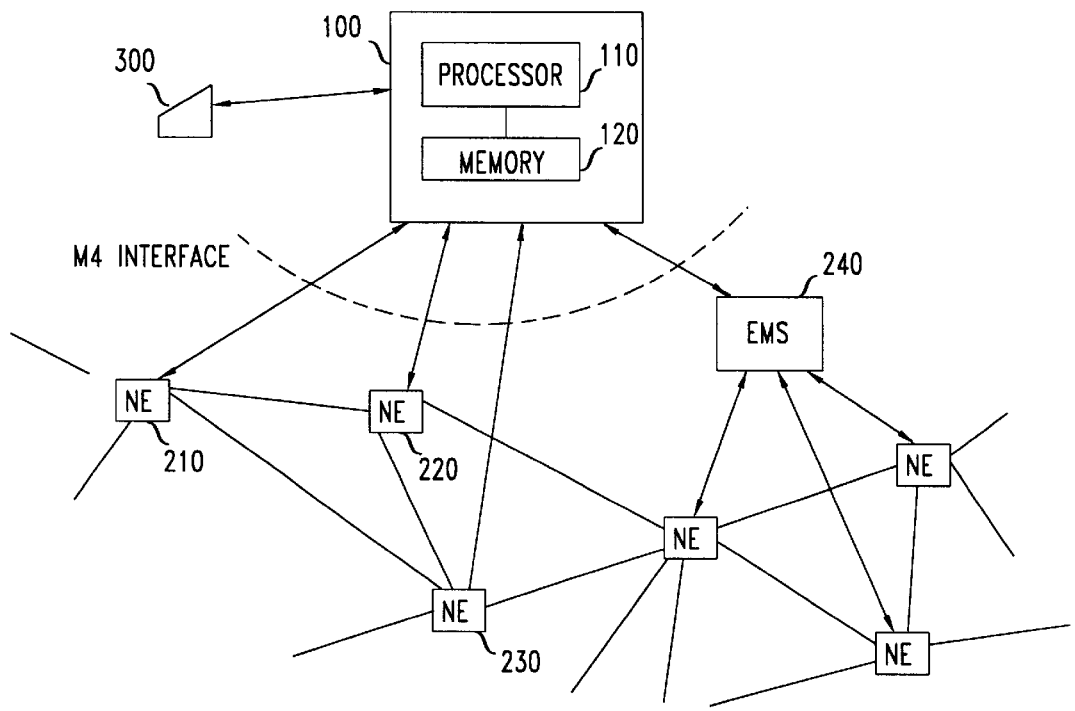
FIG. 1 presents a block diagram of an arrangement where a PMOS interacts with networks elements and with a console to control quality of service offered by the network.

FIG. 1 depicts an ATM PMOS 100 that comprises a processor 110 coupled to memory 120. Illustratively, ATM network elements (NEs) 210, 220, 230 are coupled to PMOS 100 and interface with PMOS 100 in accordance with an agreed-upon interface protocol, such as the M4 ATM interface standard, or an enhanced version thereof. Also coupled to PMOS 100 is an Element Management System (EMS) 240 which, in turn, is coupled to a number of NEs. EMS 240 is a system of the prior art variety that receives information from a number of NEs and reports that information; in this case to PMOS 100. Lastly, FIG. 1 includes a network management console 300 that is coupled to PMOS 100. An operator responsible for the network interacts with PMOS 100 through console 300.

Figure 2:
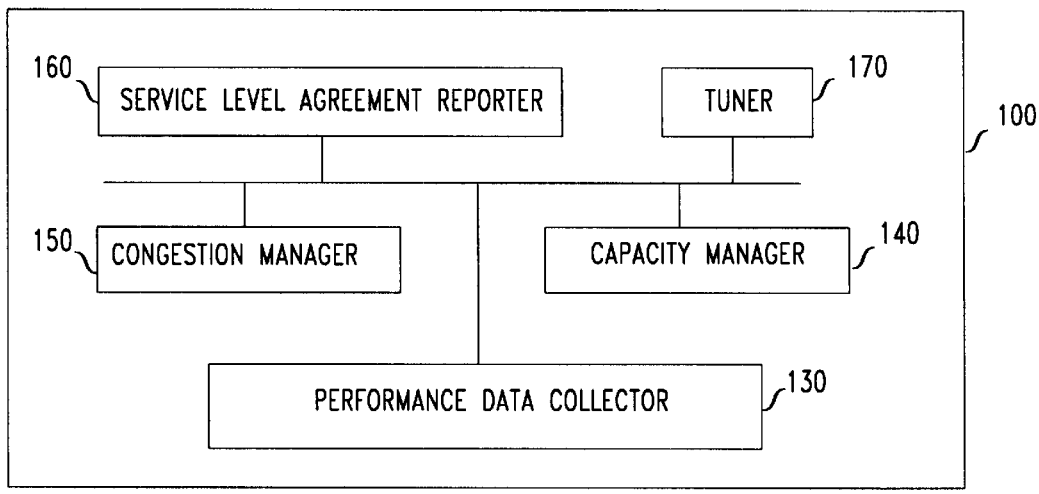
FIG. 2 depicts the functional components within the FIG. 1 PMOS.

FIG. 2 illustrates some of the functional components of PMOS 100. The primary mission of performance data collector 130 is to collect the raw data from the NEs and distribute it to the other units. Although this can be done with microprocessor 110, it can also be done with a separate adjunct, such as Concord Network's Health™ system. Some of these commercial collectors also performs some analysis of the data and provide a report that reflects this analysis. For example, some of the commercial collectors can identify the ten worst performing ports.

The output of performance data collector 130 is fed to capacity manager 140, to congestion manager 150, to Service Level Agreement reporter 160 and to tuner 170. Capacity manager 140 gathers the information provided by collector 130 and maintains a historical store of the data supplied by collector 130. With the aid of various generated reports that are sent to console 300 upon request of the console, capacity manager 140 guides network engineering, such as installation of new capacity, etc. Congestion manager 150 provides reports to console 300 regarding congestion problems that need immediate, or near real time, attention. For example, a radio station that broadcasts some contest can expect a large volume of traffic, and such traffic can easily cause an overload. Congestion manager 150 report to console 300 can alert the console operator of such a congestion condition to allow the operator to perform whatever controls that the operator can exercise over and above what tuner 170 does. Congestion manager also reports on conditions such as non-availability of ports or other equipment modules, loss of data, and failures to properly collect data. Service Level Agreement reporter 160 is charged with formulating reports to large customers regarding the overall service that the customer is receiving over the entire network. For example, there are many enterprises such as Sears, General Motors, etc. that contract for substantial network resources, and it is the mission of reporter 160 to create reports that would inform such customers whether the service they do receive meets the agreed-upon and contracted service levels.

The accent of this disclosure regards tuner 170, which based on the inputs provided by collector 130, recommends settings for the adjustable controls of the NEs and, where possible, actually affect those controls.

Functionally, all of the NEs are the same in the sense that they carry packet traffic. However, there is no requirement in the FIG. 1 arrangement for the NEs to be of any one given variety or manufacture. Different types of NEs are perfectly acceptable. Still, each NE includes a plurality of input ports on which incoming packets are received, and a plurality of output ports on which outgoing packets are delivered. Customer devices (not shown) are coupled to some of the ports. When a customer device wishes to place a call, it negotiates a particular level of service with the network, and when the negotiation is successful, communication commences. There are a number of different levels of service that can be negotiated, ranging from the poorest Quality-of-Service (QoS) that guarantees no particular rate of accepted packets, to the highest QoS that guarantees a given, constant, bit rate.

When the network engages in the negotiations and guarantees a certain level of service to its customers, it concerns itself with the load to which the ports in each NE in the network commit themselves to carry. Obviously, it is proper for an NE to commit one of its ports to carry its full capacity, and one can assume that such a condition does occur from time to time. Even when such a condition occurs, however, it still remains that not all customers continuously transmit at the maximum agreed-to rate and, therefore, some capacity is typically left unused even at a fully committed port. This capacity can be used by active customers to send packets at a rate higher than agreed-to, although this higher rate is not guaranteed. Also, the network can afford to overbook somewhat, or over-commit, some ports of an NE, with reasonable assurance that the ports will still meet their QoS agreements with its customers. Of course, in the case of capacity overbooking there is a finite chance that packets received at a network element will find themselves blocked because the output port through which they need to leave is fully occupied.

While the above-described mechanism that contributes to packet loss is the most prevalent cause of packet loss and is, therefore, the most important, it should be realized that incoming packets may also be lost within a network element because the header information of the packets is somehow corrupted or is otherwise inappropriate, or incorrect. While such losses are not necessarily related to overbooking, they do affect QoS and, therefore, some embodiments of PMOS 100 concern themselves with such losses.

Associated with the task of negotiating the admission of connections, the NEs of the FIG. 1 network have adjustable parameters that contribute to the decisions on connection admission, overbooking, etc. The purpose of these adjustable parameters is to permit network operators to achieve a satisfactory level of network performance under heavy loads of the hard-to-model packet traffic. The tuning of these adjustable parameters has proven to be difficult, particularly when this is attempted on the basis of data collected from only the particular NE to be tuned, or from a few NEs. It is anticipated that such difficulty would be compounded in an arrangement where different types of NEs are employed that are manufactured by one manufacturer or a number of different manufactures. It may be noted that different types of NEs can have different capabilities in connection with the adjustable parameters. For example, some may have the ability to affect the overbooking factor on a port basis, while other can affect the overbooking factor only for sets of ports.

In accordance with the principles disclosed herein, the adjustable parameters of the NEs are controlled based on information that is collected and analyzed from the entirety of the network, and not just from the controlled NE. Accordingly, each of the ATM NEs periodically sends information to PMOS 100, either directly or through an EMS.

Illustratively, the arrangement of FIG. 1 corresponds to an ATM network. The discussion that follows relates to ATM networks, and in the context of ATM networks, packets are also called cells. In the discussion that follows the term "cells" is often used, but it should be clearly understood that the principles disclosed herein apply to all packet networks and not merely to ATM networks.

Thus, at least with the granularity of reporting on each port of the NE, the NE sends information that, illustratively, includes:

Cells received,

Cells transmitted,

Cells lost due to congestion,

Cells lost due to header error check violations and other protocol errors

Utilization factor,

Spare capacity, and

Values of tunable parameters that affects loss of cells.

Other data can also be included, of course, such as reporting on status of data links and related equipment. Also, perhaps off-line, other data is provided to inform PMOS 100 of the network topology, the connectivity of the NEs, the capacity of each link in the network, the capacities already committed to the various virtual connections, the current settings of the adjustable parameters, etc. This information is mostly used by capacity manager 140.

It may be noted that the general behavior of the network does not change dramatically from one instant to the next and, therefore, the sending of information from the NEs to PMOS 100 need not be continuous. We selected a nominal data collection interval of 15 minutes, and in those NEs that employ this interval, transmission of data from each NE to PMOS 100 occurs every 15 minutes. It should be appreciated, however, that not all network elements have to have, or indeed should have, the same data collection interval. It is quite possible to have some types of network elements have a shorter or longer data collection interval, and the distinction need not necessarily be as to type. It could, for example, be related to the volatility of load changes that a particular NE has historically experienced. Accordingly, PMOS 100 provides a signal to the NEs that synchronizes the reporting of data, and specifies the data collection intervals.

It may be observed that the connection between PMOS 100 and NE 230 is unidirectional—only from NE 230 to PMOS 100. This intends to show that PMOS 100 is not limited to one type of NE, is not limited to NEs that are of a particular manufacturer, and is not limited to interacting only with NEs that can communicate bi-directionally. The uni-directional operation relates to the ability to specify collection intervals, and synchronization of the reporting. It does not necessarily relate to the ability of PMOS 100 to control the adjustable parameters. It is possible for the FIG. 1 network to work with NEs that do not admit of any electronic control of parameters, although it is recognized that at least in connection with such NEs, optimized control is not likely to occur.

As depicted, PMOS 100 comprises a single processor 110. It should be understood, however, that processor 110 can comprise a plurality of sub-processors, for example, microprocessors. Different sub-processors can easily handle different NEs that report asynchronously (such as NE 230). Also, being aware that processors are available which can handle a number of asynchronous interrupts, one can appreciate that receiving reporting data from effectively asynchronous NEs such as NE 230 is quite easy, in spite of the fact that communication is uni-directional. Of course, for NEs that accept synchronization signals, it is expected that the collection intervals would be synchronized, at least so that reports can be made with reference to some common time interval, such as "busy hour."

It is expected that at least in some embodiments of this invention, the specifics about the reporting NEs, such as type, and NE identifier, are known to PMOS 100 a-priori by virtue of the manner by which the NE makes connection to PMOS 100, time of reporting, etc. In other words, the connections between PMOS 100 and the NEs in such embodiments are provisioned and administered a-priori. Other embodiments, however, allow for each transmission from an NE to be accompanied by information that supplies the NE type, an NE identifier, an NE port ID, and the time interval that is represented by the reported data.

The reporting of information from the ATM NEs may be less granular than merely reporting on cells of a port. Specifically, the periodic data reported may include information for each provisioned Virtual Channel Link (VCL) and Virtual Path Link (VPL), such as Cells received at each selected VCL or VPL.

Cells transmitted at each selected VCL or VPL.

Cells discarded at each selected VCL or VPL due to either a Usage Parameter Control (UPC) or Network Parameter Control (NPC)—in the receive direction.

High priority cells discarded at each selected VCL or VPL due to UPC/NPC action—in the receive direction.

A VPL comprises a collection, or bundle, of VCLs. Usage Parameter Control is a control that is exercised at the point where a source of packets connects to the ATM network. When a call is negotiated and provisioned, a certain maximum packet rate is agreed upon. When such a source transmits at a rate higher than agreed on, and there is not enough capacity in the network, the UPC throttles the source. NPC is similar to UPC, except that this control is exercised at the coupling between the ATM network of one provider and the ATM network of another provider (because each provider worries only about not overloading its own network).

Not all VCLs and VPLs on a given ATM NE are generally reported on. Rather, a maximum number of VCLs and VPLs is set, and that number generally varies with the type of the subject NEs. The VCLs and VPLs that are candidates for such monitoring are established through provisioning. The VCLs and VPLs belonging to all Permanent Virtual Connections (PVCs) are candidates for such selection. Depending on the type of ATM NE, the VCLs and VPLs that are associated with Soft PVCs (SPVCs) can also be candidates for such provisioning.

PMOS 100 provides a control signal to direct an NE to initiate or terminate the reporting about VCLs and VPLs.

With respect to a particular NE, a given call that is handled by the NE is denoted by its Virtual Call Connection (VCC), for example VCC-100. Denoting a VCL in an incoming link that supports VCC-100 by $VCL_a$, and denoting a VCL in an outgoing link that supports VCC-100 by $VCL_b$, we define a Cell Loss Ratio (CLR) in a given direction by: cells arriving at $VCL_a$, less cells arriving at $VCL_b$, divided by cells arriving at $VCL_b$. The numerator is, of course, a measure of the cells lost. In other words, $$CLR = \frac{\text{Cells lost to } VCL_b}{\text{Cells transmitted via } VCL_b}$$

To generalize, Packet Loss Ratio, or PLR, is defined by $$PLR = \frac{\text{Packets lost}}{\text{Packets transmitted}}.$$

This definition holds whether it is for a VCL, a VPL, or a port. Of course, when a port carries traffic of different classes (discussed in more detail below) packets lost in VCLs that carry traffic with no promised Quality of Service are not considered in evaluating PLR because there is no reason to degrade the effective PLR of a port due to lost packets in support of a service that requires no particular level of QoS.

To effectively process the periodically collected traffic and performance data already described, additional information is needed by PMOS 100 concerning (1) traffic descriptors for VCCs and Virutral Path Connections (VPCs), (2) the correlation between VCCs/VPCs and VCLs/VPLs, and (3) the correlation between VCLs/VPLs and the ATM NE ports. Accordingly, this information is included in the reporting to PMOS 100, including the traffic direction to which the data pertains.

With respect to traffic descriptors, illustratively, the following information is provided and associated with a particular ATM NE port and traffic direction.

Provisioned VPC Traffic Descriptor Information

Virtual Path Link identifier.

Peak Cell Rate of Virtual Path Connection (PCR-VPC).

Provisioned VCC Traffic Descriptor Information

Virtual Channel Link identifier.

Service category.

Peak Cell Rate of Virtual Channel Connection (PCR-VCC).

Sustainable Cell Rate of Virtual Channel Connection (SCR-VCC).

Maximum Burst Size of Virtual Channel Connection (MBS-VCC).

Minimum Cell Rate of Virtual Channel Connection (MCR-VCC) for ABR service only.

Threshold crossing alerts is one of the measures that PMOS 100 develops, either directly from received data that reports about such alerts (such as from EMS 240) or from the raw data that PMOS receives.

Cells lost due to congestion on each ATM NE port (i.e. in the transmit direction).

Cell lost due to Header Error Check violations and ATM protocol error on each ATM port (i.e. in the receive direction).

Cells discarded at each selected VCL of VPL due to of Virtual Channel Connection (PCR-VCC) High priority cells discarded at each selected VCL of VPL due to of Virtual Channel Connection (PCR-VCC).

Advertised available bandwidth per port, per service category, as provided by the previously referenced Private Network-Network Interface (PNNI) standard.

The following describes some of the basic analyses that PMOS 100 carries out, which are then employed to develop recommendations for altering behavior of the network elements and for effecting such recommendations.

Busy Period Determination

Prior to identifying the "busy period," a number of parameters need to be selected in order to have a meaningful measure.

1. Duration of the busy period (category-1 interval). PMOS 100 employs a default duration of one hour as the as duration of a busy period, synchronized to the "wall clock." However, PMOS 100 accepts inputs from console 300 for any other operator-specified reference that is consistent throughout the network. Advantageously, such duration would be a multiple of the measurement and reporting interval (category-0 time interval).
2. Interval of time within which the busy period is selected (category-2 time interval, corresponding typically to number of category-1 time intervals). A default time of 24 hours seems appropriate but, of course, the operator of console 300 can make any other choice.
3. Selection of specific dates to be included in the database for the busy period determination (category-3 time interval, corresponding to a number of category-2 time intervals). In our embodiment, we employ a default interval of 20 days. As in category-1 and category-2 time intervals, above, the operator of console 300 can make any other choice.
4. Choice of either (a) time-consistent period (which is the default) or (b) extreme-value engineering busy period, such as "bouncing busy hour". Based on this parameter, one can have a measure of traffic conditions, for example, within any selected hour of the day of the last 20 days ("time consistent"), or the measure of traffic at the busiest hour in each day of the last 20 days ("bouncing busy hour").

The actual busy period determination is quite straightforward, since the raw data can easily be organized by PMOS 100 in a table format that includes, for example, a column for each of the following: NE Type, NE ID, NE port ID, time interval (e.g. 10:00 EST, 10:15 EST, etc.), Date, VCC ID, VCL ID, Cells received, Cells transmitted, Cells lost due to congestion, Cells lost due to HEC or ATM protocol error, service category, etc. Selecting an array from this table that corresponds to the category-3 time interval (for example, 20 days) allows one to identify whatever sub-array of data is necessary (for example, the sub-array of data for a particular VCC of a particular port) and identify the busiest category-1 time interval (for example, one hour) in each of the category-2 time intervals (for example, in each day).

The above describes, basically, a database query and selection operations. Of course, the data can be stored in a bona fide commercially developed database, and the formal database language that comes with the selected database product can be employed. By way of example, we considered using Oracle and Informix products, which are database products that are geared to large databases.

The above demonstrates that busy period determinations can be made with fairly fine granularity. Of course, the determinations can be made with less fine granularity by simply combining information, or selecting information in a different manner. For example, one can easily select the data relative to the entirety of an ATM NE rather that selecting for a particular VCC. On the other hand, some additional information is derived when PMOS 100 analyzes the fine-granularity data and develops measures such as mean, median, standard deviation, etc. While such data might not be of immediate value in the control of the adjustable parameters of the network NEs, reporting of this data to console 300 is of assistance in the future engineering of the network.

Busy Period Load

PMOS 100 provides busy period load information.

For a Time Consistent Busy Period determination, PMOS 100 provides the sample mean over the category-3 time interval. For example, PMOS 100 may determine that, on the average, a given port transmitted X cells between 10:00 AM and 11:00 AM over the past 20 days. PMOS 100 also provides the average busy period utilization factor of ports, which corresponds to the average load of the port under consideration, divided by the capacity of the port (where capacity of the port corresponds to the Peak Cell Rate (PCR) of such a port). That is, the average utilization factor, $\rho$, is:

$$\rho = \frac{\sum_{intervals} \text{count of transmitted cells at } NE\ Port \text{ during interval}}{PCR(port) \times \text{total time of intervals}}$$

Applications of Bouncing Busy Period data often involve the use of both the sample mean and the sample variance of the load in order to support Extreme Value Engineering methods. Accordingly, for a Bouncing Busy Period determination based upon a category-3 time interval specified by the operator of console 300, PMOS 100 provides the sample mean and the sample variance (over the set of category-2 time intervals), and the average busy period utilization factor.

Busy Period CLR Performance—Congestion

The busy period congestion-related CLR performance for a selected set of ATM NE ports and for a selected category-3 time interval can be found from the busy period determination by simply culling out the appropriate information from the table; specifically from the "Cells received" column the "Cells lost due to congestion" column. Thus, PMOS 100 provides, upon request from the operator of console 300, any or all of the following:

1. The sample mean (over the busy periods for a specified category-3 time interval) of the cells lost due to congestion.
2. The sample mean (over the busy periods a specified category-3 time interval) of the cells transmitted, i.e., the sample mean of the busy period load.
3. The ratio of item 1 to item 2, i.e., the estimated CLR.
4. The average busy period utilization factor.

The relative busy period congestion-related CLR performance for each of the ATM NE Ports associated with a specified category-3 time interval can be found from the busy period as determined above and information for each of these ATM NE Ports of the type shown by the "Time interval", "Cell transmitted", and "Cells lost due to congestion" columns of the table.

Additionally, PMOS 100 provides any or all of the following information upon request from the operator of console 300:

1. The sample mean (over the busy periods for a specified category-3 time interval) of the cells lost due to congestion on each ATM NE Port.
2. The sample mean (over the busy periods for a specified category-3 time interval) of the cells transmitted on each ATM NE Port, i.e., the sample mean of the busy period load.
3. The ratio of item 1 to item 2 for each ATM NE port, i.e., the estimated CLR.
4. The average busy period utilization factor.

Associated with these measurements, PMOS 100 identifies the interval for which the computations relate, the busy period (if a Bouncing Busy Period is used), and a list of all ATM NE ports that are included, ranked from the highest CLR to the lowest CLR. As indicated above, PMOS 100 accepts threshold inputs from console 300, and in response to a request, provides the above-identified information only for those ATM NEs, or only for those ports, which exceed the thresholds. This provides an ad hoc mechanism for reducing the amount of data that is sent to PMOS 100.

Busy Period CLR Performance—Header Error and ATM Protocol Processing

The above-described process focuses on congestion-related CLR performance, and it is anticipated that the performance information derived from this process would be of significant value to managers of ATM networks. PMOS 100 also provides information that focuses on CLR performance related to header error and ATM protocol processing. This information is derivable from the above described table, and more specifically, from the "Cells lost due to HEC or ATM protocol error" column, in conjunction with the table columns identified in connection with the "Busy Period CLR Performance—Congestion" section above. It should be realized that its is quite easy to substitute the "Cells received" column for the "Cells transmitted" column in the above-disclosed determinations.

CLR Performance Processing for Other Periods

The preceding focused on CLR performance processing for busy periods, which is anticipated to be the primary area of interest for network managers. It is anticipated, however, that CLR performance at other periods may be of interest. Accordingly, PMOS 100 provides all of the above-disclosed determinations for any time interval specified by the operator of console 300.

Class of Service

The above discussion does not address class of service to make it clear that the above-described determinations can be easily employed in embodiments that comprise older ATM NE types which support only a single class of service. New types of network elements, however, support a plurality of service categories. This includes a class of service which guarantees that the source would be able to send packets at a constant bit rate (CBR). A lower class of service allows real-time variable bit rate. At this class of service, the network guarantees to deliver an agreed-upon average packet rate with a delay that is not greater than some level, in support of services that require real-time performance, such as voice communication. A still lower class of service allows non-real time variable bit rate, which is the same as the real-time guarantee in terms of promised delivery of packets but with a much more lenient delay requirement. A yet lower class of service is known as Available Bit Rate, or ABR, service, which employs feedback to offer a bit rate that relates to the available capacity. Lastly, the lowest class of service is Unspecified Bit Rate (UBR), which guarantees no particular QoS.

When the ATM network works only with a single class of service, and that class is the CBR class, the allocations at the NEs effectively correspond to "peak rate allocation," the exclusion of statistical multiplexing and the exclusion of "overbooking." Under such operating conditions, the CLR is expected to negligible, except under operational error of assigning too much traffic to a given ATM NE port. However, performance objectives for Cell Delay Variation (CDV) can impose loading limits for a given ATM NE port. CDV can be estimated using in-service performance monitoring techniques. See ITU-T Recommendation I.610, "B-ISDN Operations and Maintenance Principles and Functions," November 1995.

CDV can be controlled by properly loading ATM NE ports. For a given ATM NE port, both its utilization factor and the total number of active VCCs on that port are relevant. See J. W. Roberts and J. T. Virtamo, "The Superposition of Periodic Cell Arrival Streams in an ATM Multiplexer," IEEE Transactions on Communications, February 1991, and C. A. Cooper, "Some Considerations for Cell Delay Variation," Standards Contribution, Document Number T1A1.3/94-096, October 1994. A simple algorithm for specifying the loading of any ATM NE port with a capacity of DS3 or higher and VCCs with a capacity of at least a DS0 (equivalent to a PCR of about 170 cells/second) in a manner that ensures compliance with reasonable per-NE CDV objectives is:

$$\rho_{port} \leq 0.85$$

For CBR traffic, this can be written in terms of the Peak Cell Rates of this Port and its VCCs:

$$\sum_{VCC} PCR(VCC) \leq 0.85 \times PCR(Port)$$

While this algorithm always yields safe results, it can be overly conservative—particularly when a port carries only a few VCCs having large capacities. More precise algorithms can be developed, for example by applying suitable programs to an established method. See the aforementioned ITU-T Recommendation I.610.

It is noted that because this single service has a stringent CLR objective of about $10^{-10}$ per NE (i.e. one lost cell in $10^{10}$ transmitted cells) considerable aggregation over a number of busy periods and/or a number of ATM NE Ports will generally be needed to verify objective conformance.

The following considers embodiments where a number of different classes of service are handled; illustratively, CBR and non-real-time Variable Bit Rate (nrtVBR).

The periodically collected traffic and performance data for ATM NE Ports is anticipated to be generally available. The periodically collected traffic and performance data for selected provisioned VCLs and VPLs might not be routinely available from some ATM NE types, for sufficient quantities of provisioned VCLs and VPLs to meet the criteria described below. Actually, use of periodically collected traffic and performance data for selected provisioned VCLs may place excessive loads on the data collection capabilities of PMOS 100, and require the use of a large data base (for example, on the order of a Terabyte, for networks of reasonable size). There are several approaches for dealing with these problems. First, the collection of traffic and performance data on a per-Service Class basis would provide both a reduction in data collection loads and PMOS database size. However, this approach to data collection is not yet standardized in the industry. Second, an operator-administered selection of VCLs that belong to particular VPLs, by Service Class, would permit data collections for a small number of VPLs (rather than a substantially larger number of VLCs).

Two Service Classes Without Periodically Collected VCL and VPL Data

The following procedure is carried out by PMOS 100 to treat two service classes when the analysis proceeds without the use of periodically collected data for all of the provisioned VCLs and VPLs on the ATM NE Ports under consideration. This procedure operates on an operator-specified set of ATM NE Ports and with respect to an operator-specified category-3 time interval.

1) Identity the data that is available with reference to the specified set of ATM NE Ports to be considered.
2) Determine the busy period and the busy period load for both service classes.
3) Determine the capacity of each ATM NE Port associated with the data.
4) Determine the VCL identifiers for all of the VCLs on each ATM NE Port associated with the data.
5) Determine the Traffic Descriptor for each VCL found in item 4. (Recall that the Traffic Descriptor includes identification of the service class.)
6) Determine the capacity of each ATM NE Port for nrtVBR traffic by:

PCR(Port−nrtVBR)=PCR(port)−PCR(port−CBR), where $$PRC(Port - CBR) = \frac{\sum_{VCC-CBR} PRC(VCC - CBR)}{.85}.$$

7) For each time interval and each ATM NE Port associated with the data and the category 3 time interval, estimate the count of cells transmitted for nrtVBR traffic by:

"Estimate of Cells Transmitted (Port−nrtVBR)"=A−B where A is the "Count of Cells Transmitted (Port)" and B is the "Estimate of Cells Transmitted (Port−CBR)" and is equal to $$\sum_{VCC-CBR} PRC(VCC - CBR) \times \text{Interval duration.}$$

8) Determine Busy Period CLR Performance—Congestion, with the following modifications:
   a) When computing the sample mean of the cells transmitted, use the result of above item 7 in place of count of transmitted cells per port.
   b) Interpret the estimated CLR as related to the nrtVBR service class.
   c) When computing the average busy period utilization factor, use the result of item 6 [i.e., PCR(Port−nrtVBR)] in place of PCR(Port).

9) Determine Busy Period CLR Performance—ATM Protocol Processing, with modifications corresponding to those of item 8 above.
10) Determine CLR Performance Processing for other Periods, with modification corresponding to those of item 8 above. The impacted steps in this determination are the sample mean calculations, the interpretation of estimated CLRs, and the utilization factor calculations.

In the above determinations, it is assumed that the CLR is negligible for VCCs in the CBR service class, so that all measured cell losses are attributed to VCCs in the nrtVBR service class. While this assumption is usually safe, a user may sometimes require a more careful check of the CLR as measured for VCCs on one or more ATM NE Ports in the CBR service class. PMOS 100 provides this more careful check using the process described below, which assumes that the involved ATM NE types can provide periodically collected data on a sufficient number of VCLs.

Two Service Classes With Periodically Collected VCL and VPL Data

The following procedure is used to treat two service classes when the analysis can proceed with use of periodically collected data for all of the provisioned VCLs and VPLs on the ATM NE Ports under consideration. This procedure operates on an operator-specified set of ATM NE Ports and an operator-specified set of Dates.

1) Establish an array of data for the ATM NE Ports to be considered.
2) Determine busy period and overall busy period load for this array (i.e., for both service classes).
3) Determine the capacity of each ATM NE Port associated with the array of data.
4) Determine the VCL identifiers for all of the VCLs on each ATM NE Port associated with the array of data.
5) Determine the Traffic Descriptor for each VCL found in item 4. (Recall that the Traffic Descriptor includes identification of the service class via the ATM Forum service category.)
6) Determine the capacity of each ATM NE Port for CBR traffic by $$PCR(Port - CBR) = \frac{\sum_{VCC-CBR} PRC(VCC - CBR)}{0.85},$$

and for nrtVBR traffic by

PCR(Port−nrtVBR)=PCR(Port−CBR)

7) For each time interval and each ATM NE Port associated with the subject data and time interval, determine the count of cells lost due to congestion for CBR traffic by $$\text{Count of Cells Lost}(Port - CBR) = \sum_{VCC-nrt-VBR} \text{Count Cells Lost}(VCC - CBR),$$

where the summation is taken over all VCLs on that Port which support CBR service, and determine the count of cells lost due to congestion for nrtVBR traffic by Count of Cells Lost(*Port − nrtVBR*) =

-continued $$\sum_{VCC-nrt-VBR} \text{Count Cells Lost}(VCC - nrtVCR),$$

where the summation is taken over all VCLs on that Port which support nrtVBR service.

8) For each time interval and each ATM NE Port associated with the subject data and catergory-3 time interval, determine the count of cells transmitted for CBR traffic by $$\text{Count of Cells } Trans.(Port - CBR) =$$

$$\sum_{VCC-CBR} \text{Count Cells } Trans.(VCC - CBR),$$

where the summation is taken over all VCLs on that Port which support CBR service, and similarly Determine the count of cells transmitted for nrtVBR traffic by $$\text{Count of Cells } Trans.(Port - nrtVBR) =$$

$$\sum_{VCC-nrt-VBR} \text{Count Cells } Trans.(VCC - nrtVCR),$$

where the summation is taken over all VCLs on that Port which support nrtVBR service.

9) Determine Busy Period CLR Performance—Congestion, with the following modifications:
   a) When computing the sample mean of the cells lost due to congestion, use the result of above item 7 for CBR service and for nrtVBR service in place of the count of cells lost due to congestion per port. (There are two values to be reported.).
   b) When computing the sample mean of the cells transmitted, use the result of above item 8 for CBR service and for nrtVBR service in place of count of transmitted cells per port. (There are two values to be reported.)
   c) When computing the estimated CLR, there are two values to be reported—one for CBR service and one for nrtVBR service.
   d) When computing the average busy period utilization factor, use the result of above item 6 for CBR service and for nrtVBR service. Also of interest is the composite utilization factor, resulting in three values of utilization factor to report—one each for CBR service, for nrtVBR service, and for the composite of all services
10) Determine Busy Period CLR Performance—ATM Protocol Processing with modifications corresponding to those of above item 9.
11) Determine CLR Performance Processing for Other Periods, with modification corresponding to those of above item 9.

Control of Adjustable Parameters of NEs

Having obtained information from the various NEs in the network and having made the various calculations and determinations disclosed above, PMOS 100 (or more particularly, tuner 170 therein) performs the analyses that lead to the recommendations that go to console 300 and the control signals that go to the NEs. In our embodiment, PMOS 100 generates and sends the developed control signals periodically (every 24 hours) but, of course, there is no requirement for periodicity, or for any particular time interval between transmission of control signals. As an aside, with respect to NEs that do not accept electronically communicated control signals, the respective recommendations are send to console 300 in the same manner as in embodiments where no NEs accept electronically communicated control signals. For all embodiments, however, PMOS 100 provides console 300 with a report that details the history of the actual and recommended adjustable parameter setting for the NEs. This report is provided on either a scheduled basis, or upon demand. This report is useful for network design purposes.

One of the analyses is, of course, whether any alarm thresholds have been exceeded. If they have, information is forwarded to console 300 to inform the operator of this fact. A report that indicates which alarms were exceeded is more of an advisory, after the fact, type of output, which is not too satisfactory as a means for controlling network performance. Another, much more important, output that is developed by PMOS 100 is a control of the Connection Admission Control (CAC) function within the ATM NEs. The function of the CAC algorithm within each ATM switch is to regulate the number of ATM connections that are established through the ATM NE, in order to protect the level of performance experienced by those ATM connections.

Basically, given the busy hour load determinations, a peak CLR is developed for each port of the NEs and compares to the objective CLR, which corresponds to the QoS of the most stringent service that is carried on the port. When the comparison indicates that the existing CLR is higher than the objective CLR and, therefore, fails to fall within the objective, it is clear that the CAC function must be made more stringent so as to reduce the overbooking. If, on the other hand, the peak CLR is lower than the objective CLR, it is clear that one might be able to increase the overbooking somewhat and still remain within the given CLR objective. The amount by which the CAC is modified, however, is a function of the NE type, the utilization factor, and the current capacity. The relationship among these factors is derived from a historical view of the data that is available in PMOS 100. This relationship is brought to light by selecting, from the corpus of historical data, a subset of data and basing the CAC on the selected data. When the data is a database, an appropriate SQL SELECT statement might be:

SELECT CAC
   FROM [data corpus]
   WHERE NE_Type=[type of NE under consideration],
      CLR=[desired CLR level for NE under consideration],
      Spare_capacity=[spare capacity of NE under consideration],
      Utilization_factor=[utilization factor of NE under consideration].

The result of this SELECT statement is a set of CAC values, and PMOS 100 selects a CAC value based on that set of CAC values. Various algorithms can be employed, such as taking an average of the set of CAC values.

What is claimed is:
1. A packet network that includes interconnected network elements, each of which has a connection admissions control (CAC) means and communication circuitry that reports on performance of the network element relative to lost packets and available capacity, the improvement comprising:
   a performance management operations system (PMOS) controller that includes
      means for receiving signals from said network elements;
      an analysis module that develops a measure of busy periods of said network elements, traffic loads at ports of said network elements during said busy periods, and utilization factors at said ports; and a transmission module that sends said measures developed by said analysis module to a console, to affect operation of said network elements, where said busy periods corresponds to a selected "time-consistent" time interval or a "bouncing busy" time interval, where the time-consistent time interval is a selected interval of a first duration that is within an interval of second duration, and the bouncing busy time interval is an interval of said first duration that has more traffic than other intervals of first duration within said second internal.

2. The network of claim 1 where said analysis module also develops load measures for virtual connections.

3. The network of claim 1 where said analysis module also develops load measures for virtual paths.

4. The network of claim 1 further comprising:

a recommendations module that, based on measures developed by said analysis module, develops measures relating to specification of connection admission parameters in said network elements and outputs said measures developed by said recommendations module, to affect operation of said network elements.

5. The network of claim of 1 where said analysis module develops measurements of said busy periods, said traffic loads, and said utilization factors for each of said network elements.

6. A packet network that includes interconnected network elements, each of which has a connection admissions control (CAC) means and communication circuitry that reports on performance of the network element relative to lost packets and available capacity, the improvement comprising:

a performance management operations system (PMOS) controller that includes means for receiving signals from said network elements;

an analysis module that develops a measure of busy periods of said network elements, traffic loads at ports of said network elements during said busy periods, and utilization factors at said ports;

a transmission module that sends said measures developed by said analysis module to a console, to affect operation of said network elements;

a recommendations module that, based on measures developed by said analysis module, develops measures relating to specification of connection admission parameters in said network elements and outputs said measures developed by said recommendations module, to affect operation of said network elements;

where the measures developed by said recommendations module indicate whether said CAC means are to be instructed to make a connection admission threshold more stringent, less stringent, or left said connection admission threshold unaltered.

7. The network of claim 4 where the measures developed by said recommendations specify threshold levels at which said CAC means should be set.

8. A packet network that includes interconnected network elements, each of which has a connection admissions control (CAC) means and communication circuitry that reports on performance of the network element relative to lost packets and available capacity, the improvement comprising:

a performance management operations system (PMOS) controller that includes ports for receiving signals from said network elements;

a processing module that develops a measure of busy periods of said network elements, a measure of capacities of said network elements, and a utilization factors of said network elements;

a recommendations module that, based on measures developed by said processing module, develops measures relating to specification of connection admission parameters in said network elements; and a transmission module that sends said measures developed by said recommendations module to affect operation of said network elements; where at least some of said network elements include an ability to provide diverse levels of Quality of Service, said network elements that support diverse levels of quality of Service provide information to said PMOS relative to traffic that each of said network elements supports at the diverse levels of Quality of Service, and said recommendation module develops said measures relating to specification of connection admission parameters in said network elements so as to meet Quality of Service expectations of traffic carried by said network elements.

9. The network of claim 8 where said network elements are of more than one type.

10. The network of claim 8 where said network elements are manufactured by more than one manufacturer.

11. The network of claim 8 where said processing module develops a measure of busy periods of said network elements, a measure of capacities of said network elements, and a utilization factors of said network elements for virtual connections of said network elements.

12. The network of claim of 8 where said processing module develops a measure of said busy periods, said capacities, and said utilization factors for each of said network elements.

13. A packet network that includes interconnected network elements, each of which has a connection admissions control (CAC) means and communication circuitry that reports on performance of the network element relative to lost packets and available capacity, the improvement comprising:

a performance management operations system (PMOS) controller that includes ports for receiving signals from said network elements;

a processing module that develops a measure of busy periods of said network elements, a measure of capacities of said network elements, and a utilization factors of said network elements;

a recommendations module that, based on measures developed by said processing module, develops measures relating to specification of connection admission parameters in said network elements; and a transmission module that sends said measures developed by said recommendations module to affect operation of said network elements, where the measures developed by said recommendations indicate whether said CAC means are to be instructed to make a connection admission threshold more stringent, less stringent, or left said connection admission threshold unaltered.

14. A packet network that includes interconnected network elements, each of which has a connection admissions control (CAC) means and communication circuitry that reports on performance of the network element relative to lost packets and available capacity, the improvement comprising:

a performance management operations system (PMOS) controller that includes ports for receiving signals from said network elements;

a processing module that develops a measure of busy periods of said network elements, a measure of capacities of said network elements, and a utilization factors of said network element;

a recommendations module that, based on measures developed by said processing module, develops measures relating to specification of connection admission parameters in said network elements; and a transmission module that sends said measures developed by said recommendations module to affect operation of said network elements, where the measures developed by said recommendations specify threshold levels at which said CAC means should be set.

15. The network of claim 14 further comprising a console that is coupled to said transmission module of said PMOS.

16. The network of claim 15 where said transmission module sends said measures developed by said recommendations module to said console.

17. The network of claim 16 where said transmission module also sends to said console a history of said measures developed by said recommendations module.

18. The network of claim 17 where said transmission module sends said history in response to a signal from said console that requests said history.

19. The network of claim 4 where said transmission module sends said measures developed by said recommendations module to said network elements.

20. The network of claim 19 where said transmission module sends said measures only to those of said network elements that need to have their connection admission control thresholds altered.

21. The network of claim 19 where said transmission module sends said measures to all of said network elements.

22. The network of claim 19 where said transmission modules sends said measures periodically.

23. The packet network of claim 1 where said signals received by said PMOS specify one or more from the following: cells received, cells transmitted, cells lost due to congestion, cells lost due to protocol errors, utilization factors, spare capacity, and values of tunable parameters.

24. The packet network of claim 23 where said tunable parameters are parameters that affect loss of cells.

25. The packet network of claim 1 where said signals received by said PMOS from said network elements arrive at a number of different time intervals.

26. The packet network of claim 1 where at least some of the signals received by said PMOS arrive in response to polling of at least some of said network elements by said PMOS.

* * * * *